(12) United States Patent
Wichert et al.

(10) Patent No.: US 10,621,888 B2
(45) Date of Patent: Apr. 14, 2020

(54) MOBILE DEVICE WITH LOCAL VIDEO FILES FOR LOCATION AGNOSTIC VIDEO PLAYBACK

(71) Applicant: FLIR Detection, Inc., Stillwater, OK (US)

(72) Inventors: Clinton M. Wichert, Edmond, OK (US); Patrick Herdman, Boca Raton, FL (US); Craig Aker, Stillwater, OK (US)

(73) Assignee: FLIR Detection, Inc., Stillwater, OK (US)

( * ) Notice: Subject to any disclaimer, the term of this patent is extended or adjusted under 35 U.S.C. 154(b) by 580 days.

(21) Appl. No.: 14/871,910

(22) Filed: Sep. 30, 2015

(65) Prior Publication Data

US 2017/0092152 A1 Mar. 30, 2017

(51) Int. Cl.
| G09B 19/24 | (2006.01) |
| G11B 27/34 | (2006.01) |
| G09B 5/02 | (2006.01) |
| G11B 27/10 | (2006.01) |

(52) U.S. Cl.
CPC ............... *G09B 19/24* (2013.01); *G09B 5/02* (2013.01); *G11B 27/105* (2013.01); *G11B 27/34* (2013.01)

(58) Field of Classification Search
CPC .......... G09B 19/24; G09B 5/02; G11B 27/34; G06F 3/0482
See application file for complete search history.

(56) References Cited

U.S. PATENT DOCUMENTS

| 6,799,205 | B2 * | 9/2004 | Ludtke | H04L 12/2805 709/217 |
| 7,904,400 | B2 * | 3/2011 | Bussert | G06F 9/4446 706/14 |
| 8,042,045 | B1 | 10/2011 | Sullivan et al. | |
| 8,654,253 | B2 * | 2/2014 | Huang | H04N 5/44513 348/239 |
| 8,977,958 | B2 * | 3/2015 | Deyo | G06F 9/4446 715/705 |
| 2003/0191820 | A1 * | 10/2003 | Ludtke | H04L 12/2805 709/219 |
| 2006/0117315 | A1 * | 6/2006 | Bussert | G06F 9/4446 717/174 |
| 2008/0028395 | A1 * | 1/2008 | Motta | G06F 8/65 717/177 |
| 2008/0055272 | A1 * | 3/2008 | Anzures | G06F 1/1626 345/173 |
| 2009/0040384 | A1 * | 2/2009 | Huang | H04N 5/44513 348/569 |

(Continued)

*Primary Examiner* — Nathan Hillery
(74) *Attorney, Agent, or Firm* — Haynes and Boone, LLP (57) ABSTRACT

Various techniques are provided to permit location agnostic playback of local video files on mobile devices used in the field. For example, such local video files may include recordings of real world human interactions with the mobile device demonstrating a plurality of tasks using the mobile device. The local video files may be used, for example, for in field training of the users without requiring access to communication resources while in the field. In some cases, the local video files may be implemented in a language agnostic manner to permit users to be trained effectively in the field without requiring language translation.

18 Claims, 8 Drawing Sheets

(56) References Cited

U.S. PATENT DOCUMENTS

| | | | |
|---|---|---|---|
| 2009/0132918 A1* | 5/2009 | Deyo | G06F 9/4446 715/705 |
| 2009/0304359 A1* | 12/2009 | Lemay | G11L 327/105 386/353 |
| 2011/0235990 A1* | 9/2011 | Anzures | G06F 1/1626 386/230 |
| 2012/0218304 A1* | 8/2012 | Anzures | G06F 1/1626 345/649 |
| 2012/0239191 A1* | 9/2012 | Versteeg | G06N 3/004 700/246 |
| 2012/0311444 A1* | 12/2012 | Chaudhri | G06F 3/04883 715/716 |
| 2013/0222115 A1* | 8/2013 | Davoodi | H04Q 9/00 340/10.1 |
| 2014/0059434 A1* | 2/2014 | Anzures | G06F 1/1626 715/720 |
| 2014/0304019 A1* | 10/2014 | Scott | G06Q 10/063114 705/7.15 |
| 2016/0054873 A1* | 2/2016 | Snibbe | G06F 3/0412 715/719 |
| 2016/0360256 A1* | 12/2016 | Van Os | H04N 21/41407 |
| 2017/0052759 A1* | 2/2017 | Chaudhri | G06F 3/0481 |
| 2017/0201478 A1* | 7/2017 | Joyce | H04L 51/10 |

\* cited by examiner

MOBILE DEVICE WITH LOCAL VIDEO FILES FOR LOCATION AGNOSTIC VIDEO PLAYBACK

TECHNICAL FIELD

The present invention relates generally to mobile devices and, more particularly, to the use of local video content with such devices.

BACKGROUND

Various types of mobile devices such as smartphones, handheld detectors, cameras, and others are used for a variety of different tasks in numerous environments. Such mobile devices may be connected to online resources through various types of wireless networks including, WiFi, Bluetooth, cellular, and others. Indeed, many such mobile devices are implemented with relatively modest amounts of local memory and require continuous wireless network connections to provide access to cloud based data storage, video streaming, web pages, and other content.

Unfortunately, many such mobile devices are effectively rendered unusable when wireless network connections are unavailable. This is especially problematic for mobile devices used in the field where wireless network coverage is often unpredictable and unreliable.

Moreover, some mobile devices, such as explosives detectors and other life saving devices, are frequently shared in the field by a variety of persons. Such mobile devices may support a variety of common and uncommon tasks, and users in the field may not always be fully trained on their usage. However, users may not have access to a manual or training materials in the field due to the impracticality of carrying paper manuals and the inability to access networks as discussed above. These problems can prevent such devices from being used to their full capacity and, in the case of life saving devices, can put the public at risk.

SUMMARY

In accordance with various embodiments further discussed herein, a mobile device may include local video files that may be accessed by users of the device to demonstrate various user operations of the device. Such local video files may be used, for example, for in field training of the users without requiring access to communication resources while in the field.

In one embodiment, a method includes storing a plurality of video files in a local memory of a mobile device, wherein the video files comprise recordings of real world human interactions with the mobile device demonstrating performance of a plurality of tasks using the mobile device; receiving a selection of one of the tasks; receiving a selection of one of the video files demonstrating the selected task; and playing the selected video file from the local memory in a location agnostic manner without requiring the mobile device to communicate with any external device.

In another embodiment, a system includes a mobile device comprising: a sensor configured to detect information in response to external stimulus; a display; a plurality of user controls;

a processor; and a local memory configured to store a plurality of video files comprising recordings of real world human interactions with the mobile device demonstrating performance of a plurality of tasks using the mobile device, and further configured to store a plurality of machine readable instructions which when executed by the processor are configured to cause the mobile device to: receive a selection of one of the tasks, receive a selection of one of the video files demonstrating the selected task, and play the selected video file from the local memory in a location agnostic manner without requiring the mobile device to communicate with any external device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Various techniques are provided to permit location agnostic playback of local video files on mobile devices used in the field. In some embodiments, such local video files may include recordings of real world human interactions with the mobile device demonstrating a plurality of tasks using the mobile device. For example, such video files may be used to supplement or replace in-person training.

In this regard, by providing video files with demonstrative training locally on a mobile device, a user in the field may be educated quickly and efficiently on how to operate the mobile device to perform one or more tasks, and without requiring an online connection to wired or wireless networks. Such in field video based training is particularly useful for users who have not had the benefit of previous in-person training or for trained users who wish to be retrained to perform tasks with increased confidence.

The local video files may be implemented in a language agnostic manner to permit users to be trained effectively in the field without requiring language translation. For example, in some embodiments, the local video files may omit any text and spoken language. Instead, the local video files may present only real world activities, non-language specific symbols, and/or non-language specific sounds. In one example, local video files demonstrating proper performance of a task may be presented with color video recordings of real world actions and sometimes accompanied by aesthetically pleasing symbols and/or sounds. In contrast, video files demonstrating improper performance of a task may be presented with black and white or grayscale video recordings of real world actions and sometimes accompanied by aesthetically dissonant symbols and/or sounds. Any desired video or audio formatting of the real world videos may be provided as appropriate for various applications.

Local video files may be selected for playback in a variety of ways. In one example, a user may select a particular local video file from a set of local video files on the mobile device. In another example, the mobile device itself may perform context based automatic selection of a local video file based on a currently selected task to be performed with the mobile device. In yet another example, the mobile device may automatically initiate playback of a local video file in response to the occurrence of an automatic playback condition.

In some cases, the local video files may be embedded in firmware downloaded to the mobile device. As a result, the local video files may be selectively updated by a system administrator or user through firmware updates. In some cases, the local video files may be selectively updated independently of the firmware.

Figure 1:
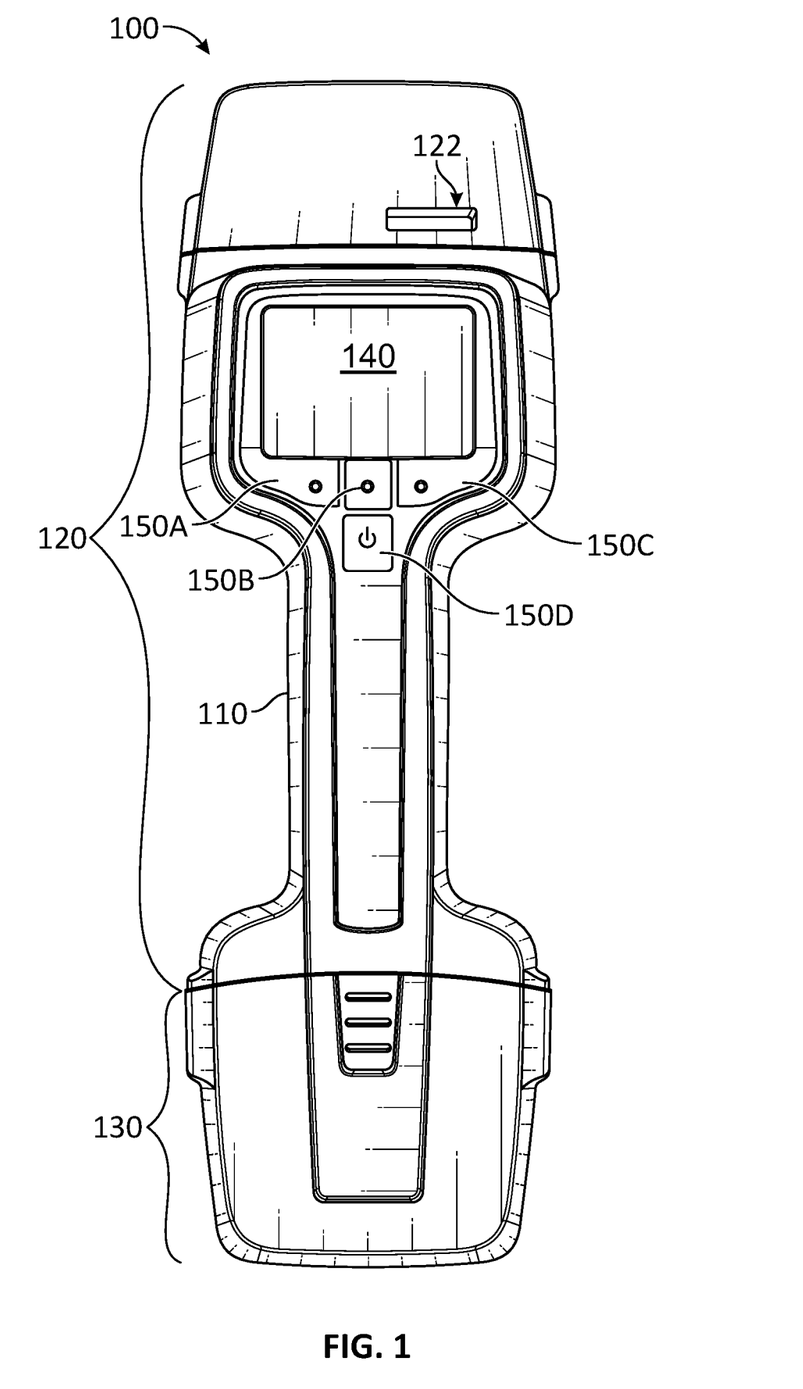
FIG. 1 illustrates a mobile device in accordance with an embodiment of the disclosure.

Turning now to the drawings, FIG. 1 illustrates a mobile device 100 in accordance with an embodiment of the disclosure. In the illustrated embodiment, mobile device 100 is implemented as a handheld portable explosives detector providing swipe sampling and vapor sampling. Mobile device 100 may be used to perform a variety of tasks and local video files may be provided to play recordings of real world human interactions with mobile device 100 demonstrating performance of such tasks. Such tasks may include, for example: using a swipe (e.g., a physical medium swiped across one or more surfaces under inspection to collect explosive material or other particles); analyzing a swipe; analyzing a vapor; charging power source 130; inspecting, checking, cleaning, unclogging, removing, replacing, verifying, or calibrating one or more components of a sensor assembly; attaching additional components to mobile device 100 (e.g., attaching a wrist strap or sling); and other tasks as appropriate.

Other types of mobile devices 100 are also contemplated. For example, in some embodiments, mobile device 100 may be implemented as a smartphone, sensor, camera, and/or other device. In this regard, local video files may be provided to play recordings of real world human interactions with such mobile devices 100 demonstrating performance of appropriate tasks for such mobile devices 100.

Figure 2:
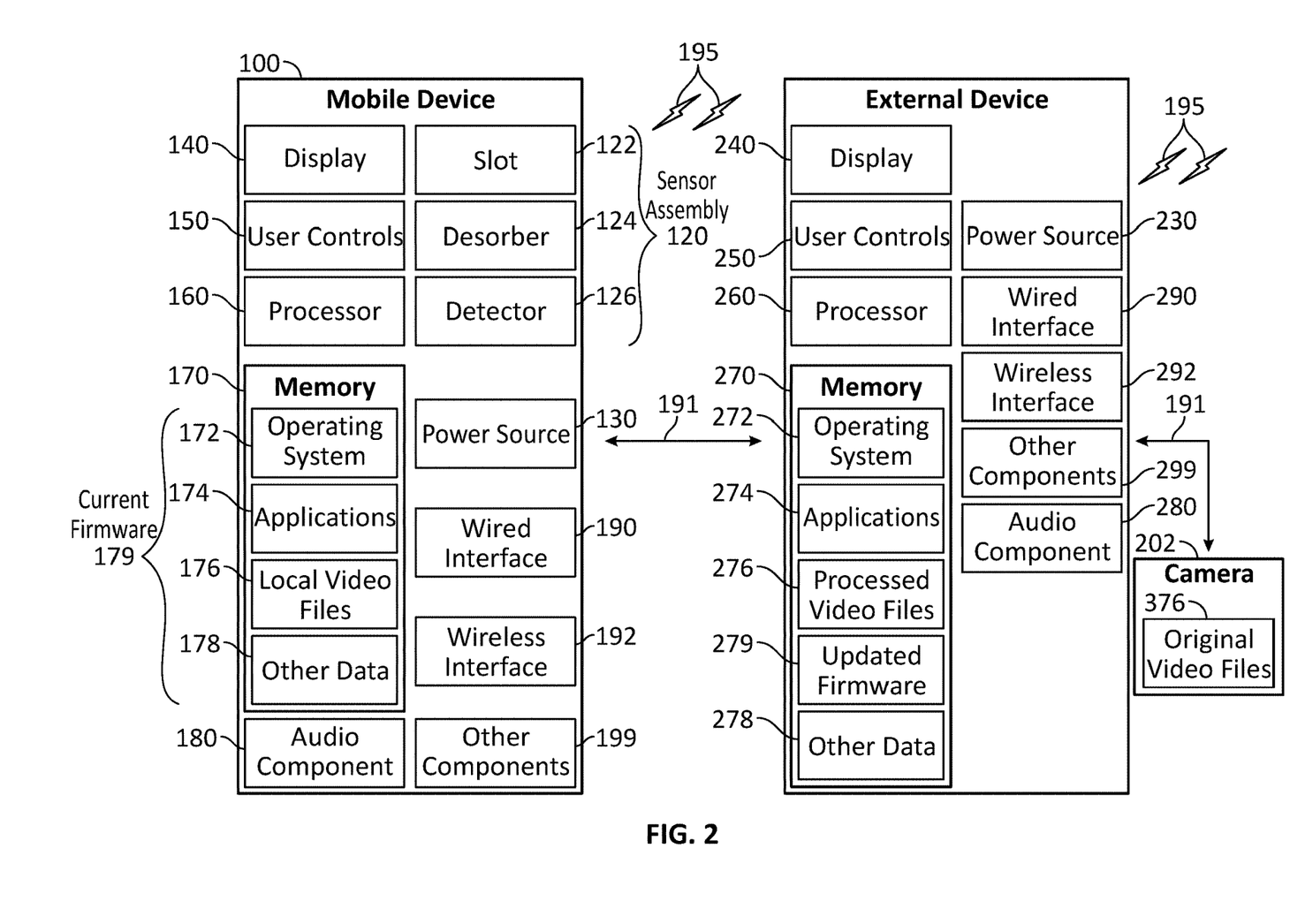
FIG. 2 illustrates a block diagram of a system including a mobile device, an external device, and a camera in accordance with an embodiment of the disclosure.

FIG. 2 illustrates a block diagram of an overall video recording capture and playback system including mobile device 100, an external device 200, and a camera 202 in accordance with an embodiment of the disclosure. Original video files 376 recorded by camera 202 may be provided to external device 200 where they may be processed (e.g., edited and/or formatted) and stored as processed video files 276. The processed video files 276 may be downloaded to memory 170 of mobile device 100 and stored therein as local video files 176. Camera 202 may be implemented, for example, as any appropriate imaging device used to capture original video files 376 comprising video recordings of real world scenes. The various video files 176, 276, and/or 376 may be provided in various formats, such as a Moving Picture Experts Group (MPEG) video file format or others as desired.

As shown in FIGS. 1 and 2, mobile device 100 includes a housing 110, a sensor assembly 120 (e.g., one or more sensors), a power source 130, a display 140, one or more user controls 150, a processor 160, a memory 170, an audio component 180, a wired interface 190, a wireless interface 192, and other components 199.

Housing 110 may be implemented, for example, as a handheld housing having an integrated handle to permit convenient portable use of mobile device 110 in the field. Sensor assembly 120 includes various features used to sense and/or detect information in response to external stimulus. For example, in the embodiments illustrated in FIGS. 1 and 2, mobile device 100 is implemented as an explosives detector and sensor assembly 120 may accordingly include various components useful for explosives detection as described below. For other types of mobile devices 100, sensor assembly 120 may alternatively or additionally include various types of sensors such as visible light imagers, thermal imagers, radiation detectors, microphones, and/or others.

In the case of an explosives detector as shown in FIGS. 1 and 2, sensor assembly 120 may include a slot 122, a desorber 124, and a detector 126 and, as further shown in FIG. 1, various components of sensor assembly 120 may be distributed at various physical locations throughout mobile device 100 (e.g., within appropriate portions of housing 110 and/or otherwise). In this regard, a physical medium referred to as a "sampling swipe" may be wiped across one or more surfaces under inspection to collect particles. The sampling swipe is inserted into slot 122 by a user. Particles on the sampling swipe are vaporized by desorber 124 and drawn into detector 126 which detects the presence of one or more particles of interest (e.g., particles associated with explosive material and/or other substances of interest). In another example, detector 126 may be used to perform vapor detection without the use of sampling swipes. Other detector embodiments are also contemplated. Moreover, in these and other embodiments, sensor assembly 120 may be implemented with additional features such as one or more sensing elements and/or additional components as appropriate for particular applications.

Power source 130 may be implemented, for example, as a battery to permit mobile and remote use of mobile device 100. In some embodiments, power source 130 may be a removable battery.

Display 140 presents information to the user of mobile device 100. In various embodiments, display may be implemented as a liquid crystal display (LCD), an organic light emitting diode (OLED) display, and/or any other appropriate display.

Figure 7:
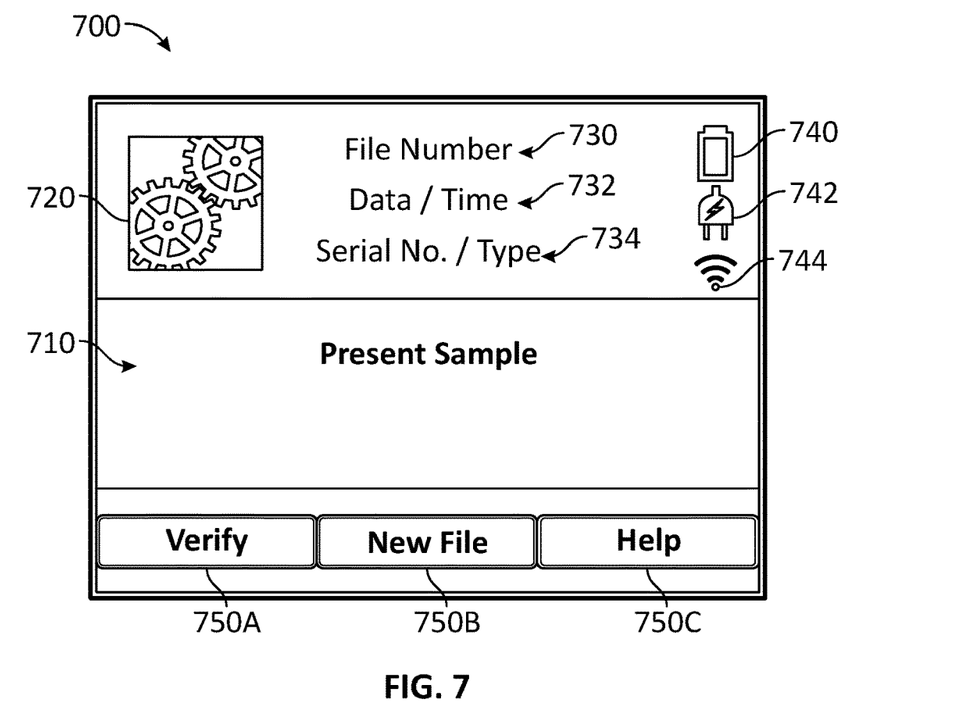
FIGS. 7-11 illustrate several user interface screens of a mobile device in accordance with embodiments of the disclosure.

For example, FIG. 7 illustrates a user interface screen 700 that may be presented on display 140 in accordance with an embodiment of the disclosure. As shown, screen 700 includes a message pane 710 that presents status information or user instructions, a status icon 720, a current file number 730, current date and time 732, serial number and device type 734 for mobile device 100, a battery charge icon 740, an external power connection icon 742, and a WiFi connection status icon 744.

Screen 700 also includes soft key tabs 750A, 750B, and 750C (collectively referred to as soft key tabs 750) which identify operations that may be performed by mobile device 100 in response to user actuation of one of corresponding user controls 150A, 150B, and 150C discussed herein (see FIG. 1).

Turning again to FIGS. 1 and 2, user controls 150A, 150B, 150C, and 150D (collectively referred to as user controls 150) receive user input to operate mobile device 100. As shown in FIG. 1, user controls 150 may be implemented as physical buttons. In other embodiments, user controls 150 may be implemented by one or more keyboards, levers, joysticks, and/or other controls. In some embodiments, user controls 150 may be integrated with display 140 as a touchscreen.

Processor 160 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of Mobile device 100. In this regard, processor 160 may execute machine readable instructions (e.g., software, firmware, or other instructions) stored in memory 170.

Memory 170 may be implemented as a machine readable medium storing various machine readable instructions and data. For example, in some embodiments, memory 170 may store an operating system 172 and one or more applications 174 as machine readable instructions that may be read and executed by processor 160 to perform various operations described herein. Memory 170 may also store one or more local video files 176 that may be selectively played by processor 160 and presented on display 140 as described herein. Memory 170 may also store other data 178, such as information detected by sensor assembly 120 and/or information used by other components 199.

In some embodiments, memory 170 may be implemented as non-volatile memory (e.g., flash memory, hard drive, solid state drive, or others), volatile memory, or combinations thereof. For example, in some embodiments, video files 176 may be stored in non-volatile memory to ensure they are readily accessible by processor 160 even if mobile device 100 is power cycled while used in the field.

In some embodiments, operating system 172, applications 174, video content 176, and/or other data 178 may be implemented as firmware 179 (e.g., one or more firmware files). In this regard, instructions for operating system 172 and applications 174, as well as data for video files 176 and other data 178, may be embedded (e.g., encapsulated) in current firmware 179 (e.g., one or more firmware files) stored in memory 170. Updated firmware 279 may be downloaded from external device 200 (e.g., through wired interface 190 and/or wireless interface 192 described herein) and stored in memory 170 as a new version of the current firmware 179. Thus, local video files 176 may be updated as part of regular firmware updates as desired.

Audio component 180 may be implemented, for example, as a speaker or other transducer with corresponding driver circuitry to provide audible sounds to a user of mobile device 100. For example, in some embodiments, audio component 180 may provide audible signals in response to manipulation of user controls 150 and/or in response to the operations of sensor assembly 120. In some embodiments, audio component 180 may output language independent sounds (e.g., non-speech sounds) included with local video files 176 during playback.

Wired interface 190 (e.g., also referred to as an auxiliary port) may be implemented as one or more physical interfaces configured to connect mobile device 100 (e.g., by Universal Serial Bus (USB), Ethernet, and/or other protocols) with various external devices (e.g., external device 200 and/or camera 202) for wired communications 191. In particular, wired interface 190 may be used to download any of operating system 172, applications 174, local video files 176, and/or other data 178 from such devices into memory 170. In some embodiments, wired interface 190 may connect to power sources (e.g., a power outlet) to charge a battery of power source 130 and/or to directly power mobile device 100.

Wireless interface 192 may be implemented as one or more WiFi, Bluetooth, cellular, infrared, radio, and/or other types of interfaces for wireless communications 195 to download information in the manner described for wired interface 190. Other components 199 may also be provided as appropriate for various types of mobile devices 100 to support, for example, application specific operations of such devices.

As shown in FIG. 2, external device 200 includes a power source 230, a display 240, user controls 250, a processor 260, a memory 270, an audio component 280, a wired interface 290, a wireless interface 292, and other components 299, any of which may be implemented in the same or similar manner as corresponding components of mobile device 100 described herein.

As shown, memory 270 includes an operating system 272, one or more applications 274, and other data 278 for external device 200. Memory 270 also includes processed video files 276 which may be embedded into updated firmware 279 and downloaded to memory 170 of mobile device 100 to replace current firmware 179 as desired.

In some embodiments, external device 200 may be implemented, for example, as a server or other computer system configured to provide firmware updates to mobile device 100. External device 200 may also be implemented to prepare processed video files 276. In this regard, external system 200 may receive original video files 376 captured by camera 202. A user of external device 200 may operate one or more applications 274 to process the original video files 376 to provide processed video files 276 for eventual download to mobile device 100. In some embodiments, applications 274 may be used to prepare updated firmware 279 for eventual download to memory 170 of mobile device 100.

Figure 3:
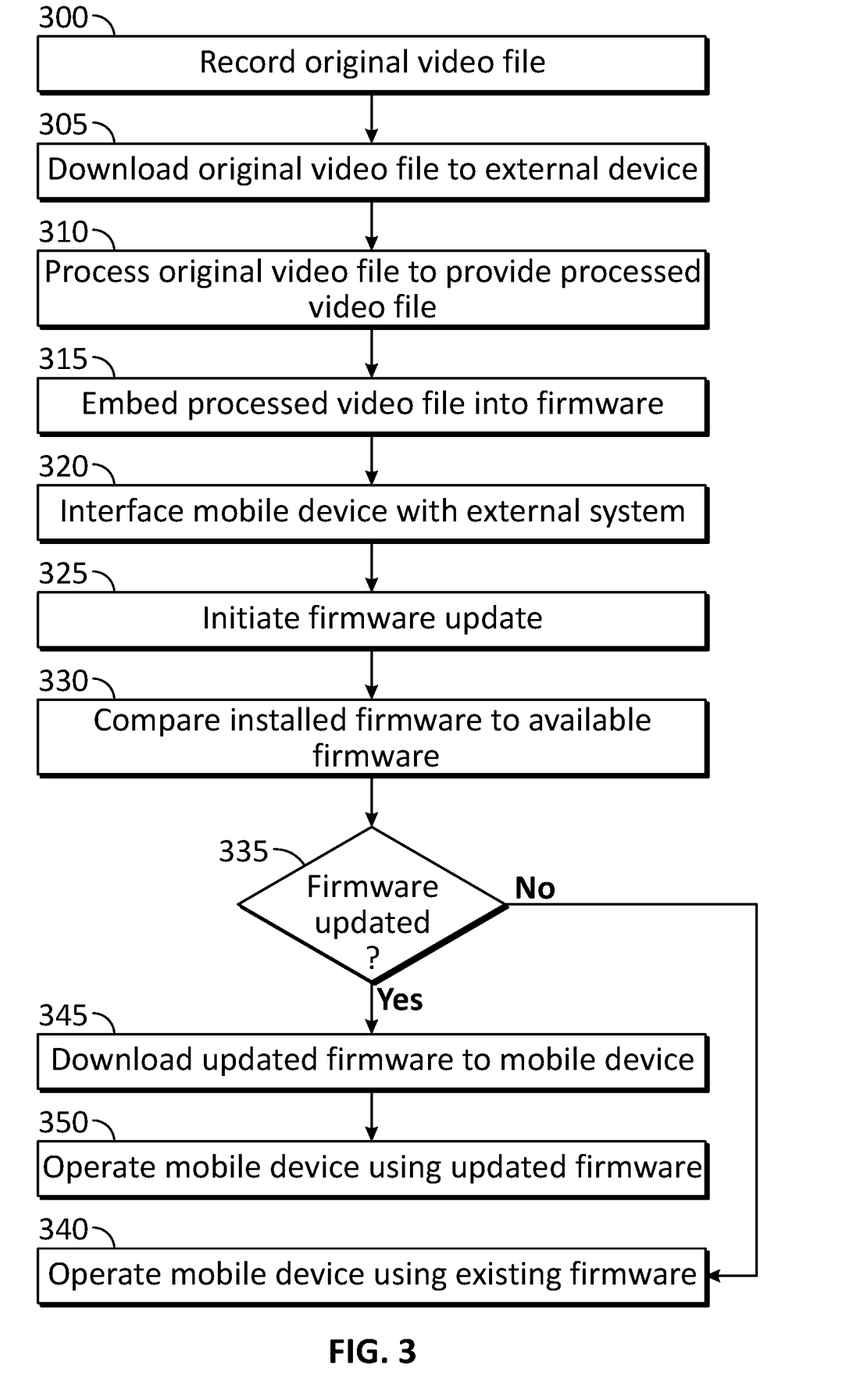
FIG. 3 illustrates a process of preparing video files for use in a mobile device in accordance with an embodiment of the disclosure.

FIG. 3 illustrates a process of preparing local video files 176 for use in mobile device 100 in accordance with an embodiment of the disclosure.

In block 300, a user of camera 202 records one or more original video files 376 that comprise recordings of real world human interactions with mobile device 100 that demonstrate one or more tasks using mobile device 100. In this regard, original video files 376 may be recorded as instructional videos (e.g., tutorials) that are converted to processed video files 276 and subsequently stored in memory 170 of mobile device 100 as local video files 176 to permit location agnostic playback of the local video files 176 on mobile device 100 without requiring mobile device 100 to rely on any external communications for playback.

In block 305, original video files 376 are downloaded from camera 202 to external device 200. In some embodiments, such downloads may be performed by transferring a physical memory card on which original video files 376 are stored in camera 202. In other embodiments, such downloads may be performed through wired and/or wireless communications 191 and/or 195. In some embodiments, camera 202 may be implemented as part of external device 200. In such embodiments, block 305 may be omitted as camera 202 may record directly to memory 270.

In block 310, a user of external system 200 operates one or more applications 274 to process the original video files 376 to prepare processed video files 276. In various embodiments, such operations may include, for example, adjustment of video length, video resolution, video color, video content, video format, additional graphics, audio content, audio format and/or any other appropriate processes to adjust the video recordings for appropriate playback by mobile device 100.

In block 315, the user of external system 200 operates one or more applications 274 to embed the processed video files 276 and other instructions and/or data into updated firmware 279 as discussed. Accordingly, the user of external system 200 may routinely create new versions of updated firmware 279 with new or revised processed video files 276 embedded therein for eventual download to mobile device 100.

In block 320, a user of mobile device 100 interfaces mobile device 100 with external device 200 (e.g., through wired interfaces 190/290 and/or wireless interfaces 192/292). In block 325, a firmware update for mobile device 100 is initiated. In various embodiments, the firmware update may be initiated in response to, for example, a user command received by mobile device 100, a user command received by external device 200, and/or automatically in response to the interface operation of block 320. In some embodiments, the firmware update may be initiated without user input (e.g., automatically and/or periodically by mobile device 100).

In block 330, mobile device 100 and/or external device 200 compares the firmware 179 stored in memory 170 of mobile device 100 with the firmware 279 stored in memory 270 of external device 200. In some embodiments, the comparison of block 330 may be performed, for example, by comparing one or more hash values, filenames, file dates, and/or other information as appropriate (e.g., a full bit-for-bit comparison of entire files is not required in such embodiments). In block 335, if the firmware 279 has been updated (e.g., firmware 279 on external device 200 is a more recent version than firmware 179 on mobile device 100), then the process continues to block 345. Otherwise, the process continues to block 340 where mobile device 100 is operated in accordance with its existing current firmware 179.

In block 345, the updated firmware 279 is downloaded from memory 270 of external device 200 to memory 170 of mobile device 100. As a result, the current firmware 179 of mobile device 100 is effectively updated with a new version. Accordingly, in block 350, mobile device 100 is operated in accordance with the new version of current firmware 179 which corresponds to the downloaded updated firmware 279 having the updated video files 276.

Variations on the process of FIG. 3 are contemplated. For example, in some embodiments, video files 176 may be updated without requiring an entire update of current firmware 179. In this regard, a local video file 176 update may be initiated in block 325, local video files 176 may be compared with processed video files 276 in block 330 and evaluated for possible updates in block 335, and processed video files 276 may be downloaded in block 345. In some embodiments, the video file update may be initiated without user input (e.g., automatically and/or periodically by mobile device 100). In some embodiments, the comparison of local video files 176 with processed video files 276 may be performed, for example, by comparing one or more hash values, filenames, file dates, and/or other information as appropriate (e.g., a full bit-for-bit comparison of entire files is not required in such embodiments).

Figure 4:
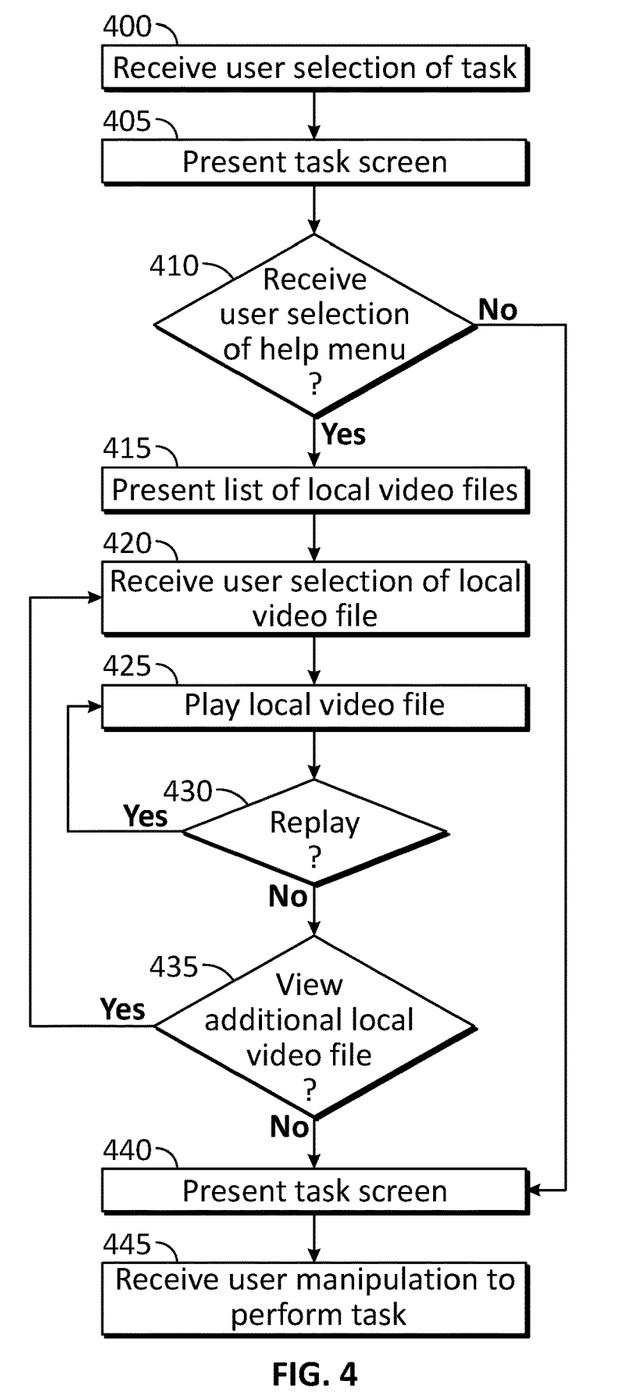
FIGS. 4-6 illustrate several processes of selecting video files for playback on a mobile device in accordance with embodiments of the disclosure.
Figure 5:
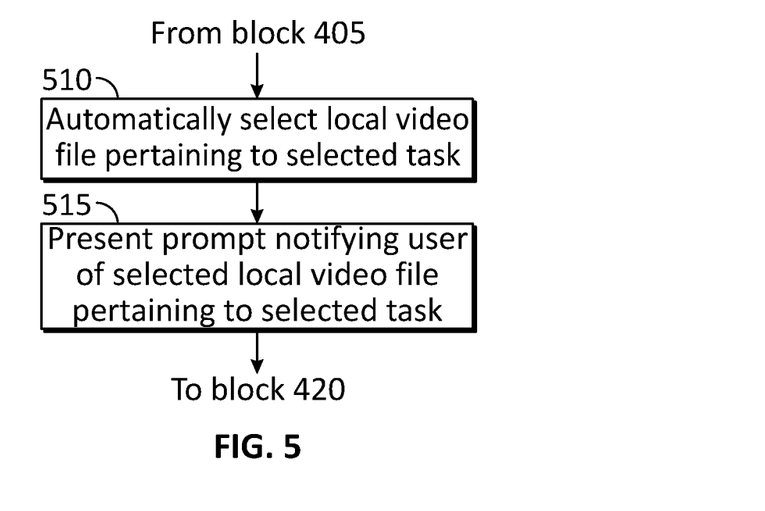
Figure 6:
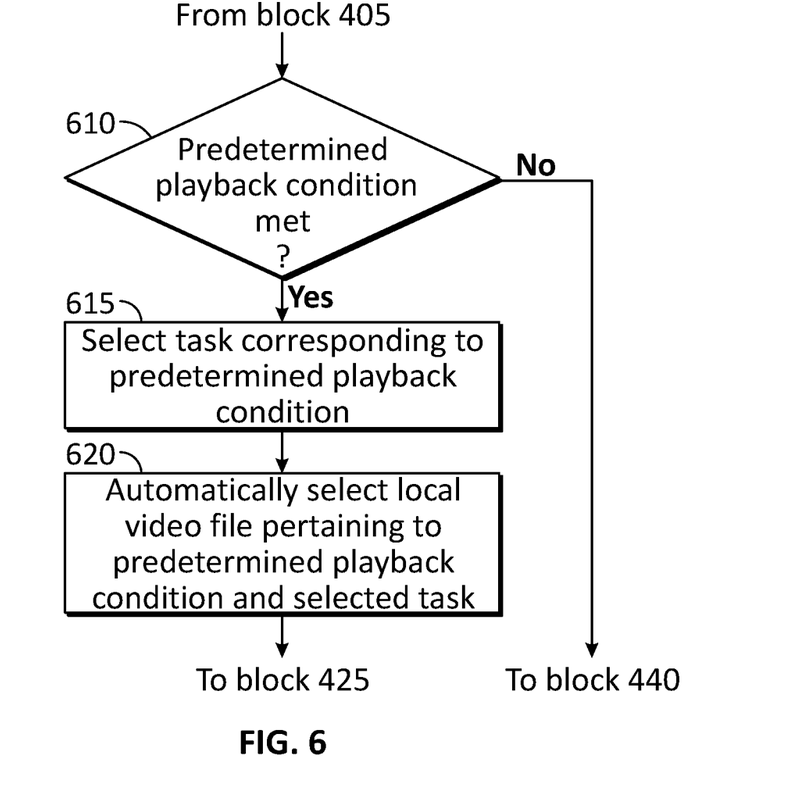

FIGS. 4-6 illustrate several processes of selecting local video files 176 for playback on mobile device 100 in accordance with embodiments of the disclosure. In particular, FIG. 4 illustrates a process of selecting a local video file 176 based on a user's choice of a particular local video file 176.

As discussed, mobile device 100 may be used to perform a variety of tasks. Accordingly, in block 400, a user selects a particular task to be performed with mobile device 100, for example, by operating an appropriate user control 150.

In block 405, mobile device 100 presents a task screen on display 140 corresponding to the selected task. For example, in user interface screen 700 of FIG. 7, the user has selected a "Swipe Sampling" task which includes passing a swipe across a surface and using sensor assembly 120 to detect particles obtained therefrom. Accordingly, message pane 710 indicates "Present Sample" which prompts the user to insert a swipe into slot 122 for analysis.

If the user is unsure how to proceed in response to the task screen, the user may choose to select a menu, such as a help menu or other menu as appropriate (block 410). For example, in this case, the user may select soft key tab 750C of user interface screen 700 by actuating corresponding user control 150C. If the menu is selected, then the process continues to block 415. Otherwise, the process continues to block 440.

Figure 8:
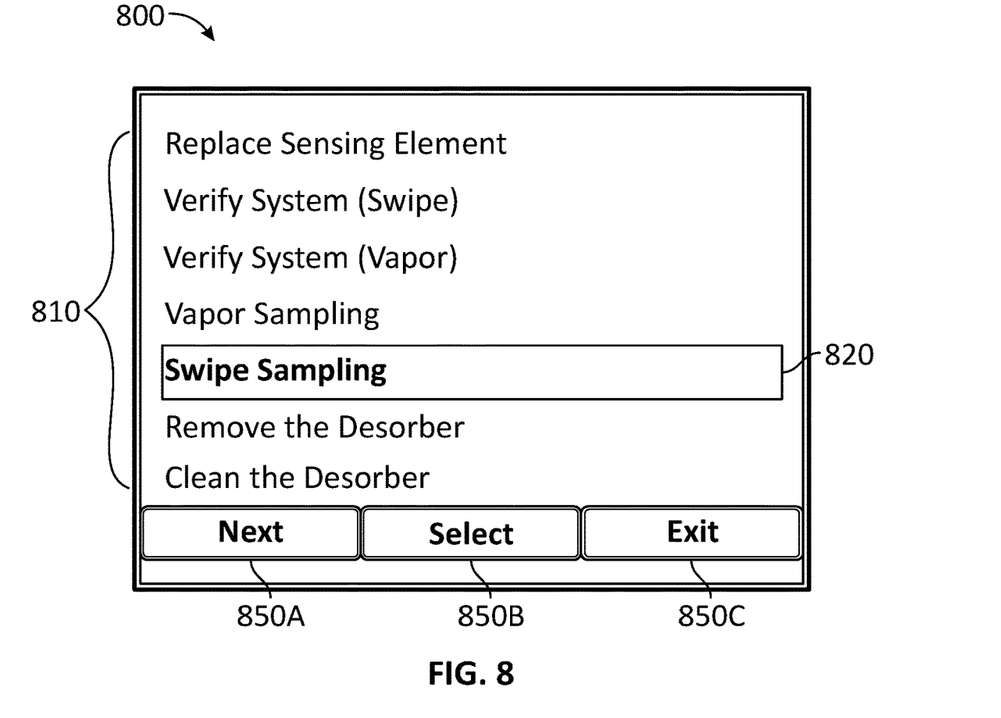

In block 415, mobile device 100 presents a list of available local video files 176 in response to the user's selection of the menu. For example, FIG. 8 illustrates a user interface screen 800 that may be presented on display 140 in block 415. As shown, screen 800 includes a list 810 of available local video files 176 and a current selection 820 of one of the local video files 176 (e.g., the "Swipe Sampling" local video file 176 is selected in this example). Screen 800 also includes soft key tabs 850A, 850B, and 850C (collectively referred to as soft key tabs 850) which identify operations that may be performed by mobile device 100 in response to user actuation of one of corresponding user controls 150A, 150B, and 150C, respectively. In particular, soft key tab 850A may be used to advance the current selection 820 through list 810, soft key tab 850B may be used to confirm (e.g., choose) the current selection 820 for playback, and soft key tab 850C may be used to exit screen 800 and return to task screen 700.

Figure 9:
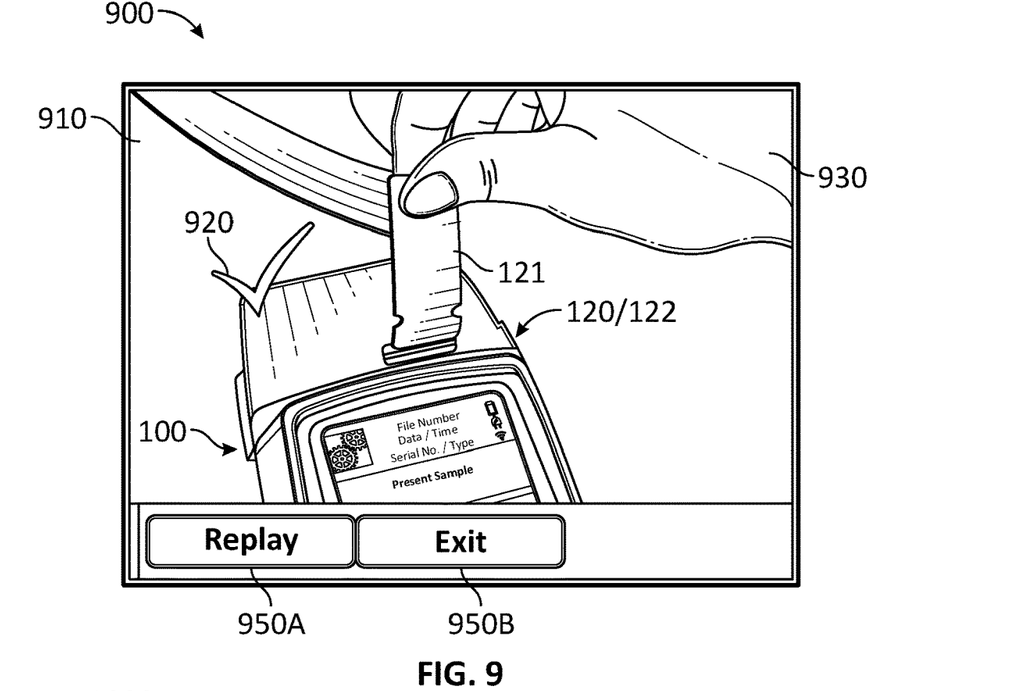
Figure 10:
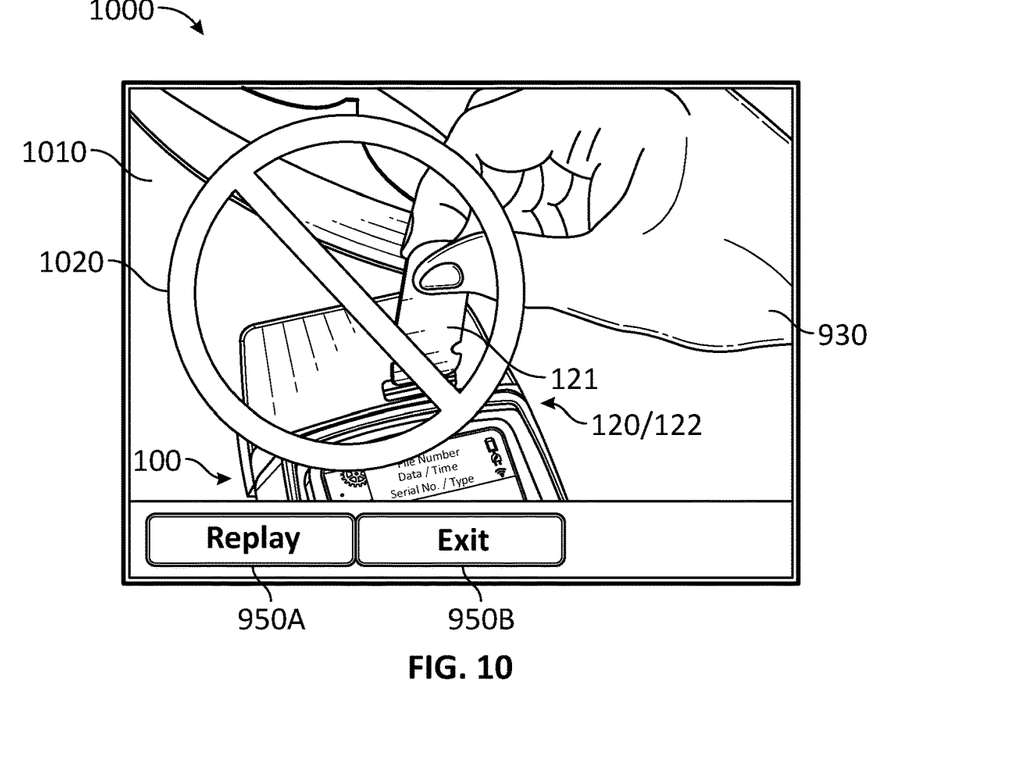

In block 420, the user selects one of the local video files 176 for playback, for example, by operating soft key tab 850B. In block 425, mobile device 100 plays the selected local video file 176. In this regard, FIGS. 9 and 10 illustrate user interface screens 900 and 1000 that may be presented on display 140 during video file playback in block 425. Screens 900 and 1000 include video images 910 and 1010 read from the selected "Swipe Sampling" local video file 176. The video images 910 and 1010 presented in screen 900 are recordings of real world human interactions with mobile device 100 demonstrating performance of various activities pertaining to the "Swipe Sampling" task previously selected in block 400.

In particular, video images 910 and 1010 show a user 930 and mobile device 100. User 930 is holding a swipe 121 in two different orientations immediately prior to inserting swipe 121 into slot 122 of sensor assembly 120. In particular, video image 910 denotes a correct orientation of swipe 121 and video image 1010 denotes an incorrect orientation of swipe 121. Language agnostic information is provided in video images 910 and 1010 to denote this difference. Specifically, video image 910 includes a yes symbol 920 (e.g., a green checkmark) superimposed over the correct user action, and video image 1010 includes a no symbol 1020 (e.g., a red "universal no" symbol) superimposed over the incorrect user action.

In some embodiments, video images 910 and 1010 may be further formatted to denote differences. For example, video image 910 may be presented in color to denote the correct user action, and video image 1010 may be presented in black and white or grayscale to denote the incorrect user action. Other language agnostic symbols, sounds, and/or formatting may be used as desired to denote correct and incorrect user actions as appropriate.

User interface screens 900 and 1000 further include soft key tabs 950A and 950B (collectively referred to as soft key tabs 950) which identify operations that may be performed by mobile device 100 in response to user actuation of one of corresponding user controls 150A and 150B. For example, soft key tab 950A may be used to replay the selected local video file 176 and soft key tab 950B may be used to exit to another screen (e.g., user interface screen 800).

Referring again to FIG. 4, after the local video file 176 playback of block 425 is completed, the process continues to block 430. In block 430, the user may choose to replay the local video file 176 (e.g., by selecting soft key tab 950A as discussed) and thus return to block 425, or exit to another screen (e.g., by selecting soft key tab 950B as discussed) and thus continue to block 435. In some embodiments, soft key tabs 950 may be used for a variety of user interactions to control playback such as, for example, pause, skip back, skip forward, fast forward, rewind, and/or other commands as appropriate.

In block 435, mobile device 100 again provides the list of available local video files 176 in the manner discussed for block 415. If the user desires to view additional local video files 176, the process returns to block 420 wherein the user selects another local video file 176 for playback (e.g., by interacting with soft key tabs 850A and 850B as discussed). Otherwise, the user returns to the task screen 800 at block 440 (e.g., by interacting with soft key tab 850C as discussed).

Thereafter, in block 445, the user engages in the selected task (e.g., performing one or more manipulations on mobile device 100) with the benefit of the training provided in block 425. In this regard, by viewing recordings of real world human interactions with mobile device 100 demonstrating performance of the particular selected task, the user will be prepared with relevant training particularly tailored to the selected task—regardless of the user's location (e.g., even without access to network connections). For example, in the case of a "Swipe Sampling" task discussed above, the user will now know correct orientation of swipe 121 when inserting it into slot 122. Moreover, when local video files 176 are provided in a language agnostic manner, such training can be performed in a universal manner regardless of the user's language preference. Moreover, in various embodiments, the training provided by local video files 176 may supplement previous training (e.g., to refresh the user's recollection of previously learned tasks) or may be entirely new to the user (e.g., to remove the need for prior training).

As discussed, other techniques may be used to select local video files 176 for playback. For example, mobile device 100 itself may perform context based automatic selection of a local video file 176 based on a currently selected task. In this regard, FIG. 5 illustrates a process of selecting local video files 176 for playback on mobile device 100 using context based automatic selection and user input. In particular, FIG. 5 identifies blocks 510 to 515 that may be performed in place of blocks 410 to 415 of FIG. 4.

In block 510, mobile device 100 performs an automatic context based selection of one of the local video files 176 that demonstrate the task previously selected in block 400. In this regard, the selection a local video file 176 may be determined based on the current context within which the selection is performed (e.g., the context of a particular task having been selected). For example, in the case of a "Swipe Sampling" task, mobile device 100 may automatically select the "Swipe Sampling" local video file 176 before receiving user input to actually play the local video file 176.

Figure 11:
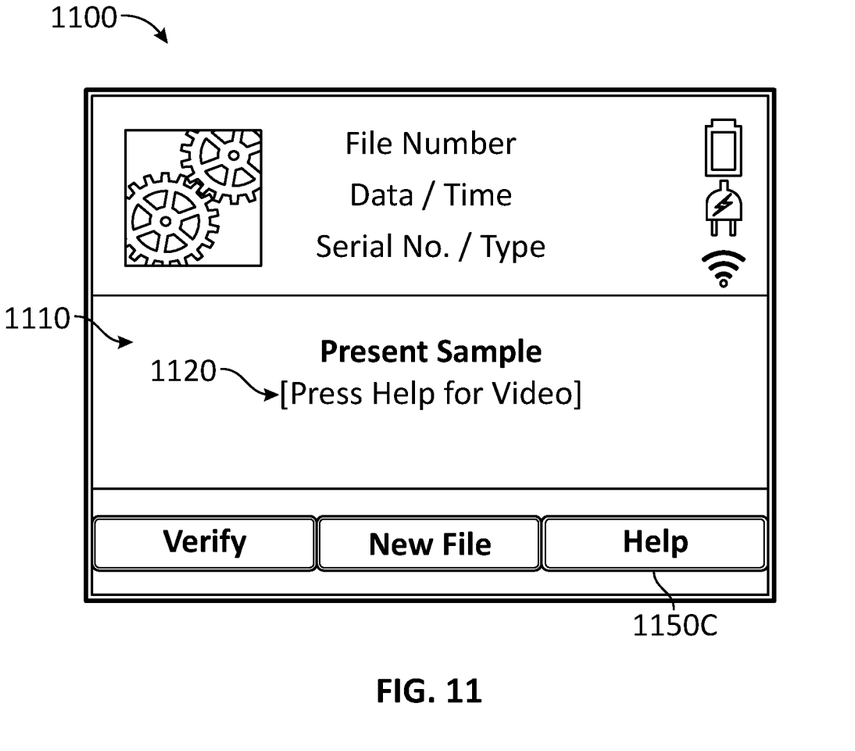

In block 515, mobile device 100 prompts the user that an automatically selected local video file 176 is available. For example, FIG. 11 illustrates a user interface screen 1100 that may be presented on display 140 in block 515 in accordance with an embodiment of the disclosure. As shown, screen 1100 includes a message pane 1110 and other features similar to screen 700 previously discussed. Message pane 1110 further includes a user prompt 1120 identifying that an automatically selected local video file 176 is available that may be accessed, for example, by the user operating a soft key tab 1150C with corresponding user control 150C. After the prompt is presented in block 515, the process of FIG. 5 returns to block 420 of FIG. 4 to receive the user selection.

FIG. 6 illustrates another process of selecting local video files 176 for playback on mobile device 100 using context based automatic selection and a predetermined playback condition. In particular, FIG. 6 identifies blocks 610 to 620 that may be performed in place of blocks 410 to 420 of FIG. 4.

In block 610, mobile device 100 determines whether a predetermined playback condition has been met. In this regard, mobile device 100 may be configured to play certain local video files 176 in response to the occurrence of particular conditions. For example, in some embodiments, mobile device 100 may require a user to perform certain tasks periodically (e.g., to perform calibration or maintenance of mobile device 100). In this regard, local video files 176 may include recordings of real world human interactions with mobile device 100 demonstrating performance of such tasks. In some embodiments, mobile device 100 may maintain a counter or schedule (e.g., as part of other data 178) to determine when such tasks are due. If mobile device 100 determines that a predetermined playback condition has indeed been met (e.g., when one of such tasks is due), the process continues to block 615. Otherwise, the process of FIG. 6 returns to block 440 of FIG. 4.

In block 615, mobile device 100 selects a task associated with the automatic playback condition (e.g., by automatically a task that is currently due, such as calibration or maintenance of mobile device 100). In block 620, mobile device 100 performs an automatic context based selection of one of local video files 176 that demonstrates the task corresponding to the playback condition met in block 610. In this regard, the selection a local video file 176 may be determined based on the current context within which the selection is performed (e.g., the context of an predetermined playback condition being met and a task associated with the predetermined playback condition due to be performed). After the automatic selection in block 620, the process of FIG. 6 returns to block 425 of FIG. 4 to play the selected local video file 176 automatically without requiring user input.

Other embodiments are also contemplated. For example, instead of performing automatic playback after block 615, mobile device 100 may instead prompt the user (e.g., similar to block 515 of FIG. 5) that an automatically selected local video file 176 is available for playback pertaining to the task due (e.g., calibration or maintenance of mobile device 100) and returns to block 420 of FIG. 4 to await further user input.

In view of the present disclosure, it will be appreciated that a variety of flexible location agnostic video playback techniques are provided which may be used, for example, to provide in field training and education for users of mobile devices—particularly those involving high risk activities. Moreover, such techniques may be applied in a language agnostic manner through appropriately formatted video recordings that may be used independent of language or location.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A method comprising:
  downloading a plurality of video files from an external device;
  storing the video files in a local memory of a handheld mobile device, wherein the mobile device comprises a sensor configured to detect a substance of interest in response to external stimulus, wherein the video files comprise recordings of human interactions with the mobile device demonstrating performance of a plurality of tasks using the mobile device;
  receiving a selection of one of the tasks;
  receiving a selection of one of the video files demonstrating the selected task;
  accessing the selected video file from the local memory in a location agnostic manner while the mobile device is operated in a handheld portable manner by a user in field without requiring any network connections and without requiring the mobile device to communicate with any external device; and
  presenting the selected video file to the user on a display of the mobile device while the mobile device continues to be operated in the handheld portable manner by the user in field without requiring any network connections.

2. The method of claim 1, wherein the receiving a selection of one of the video files comprises:
  receiving a user selection of a menu on the mobile device;
  presenting a list of the video files on a display of the mobile device; and
  receiving a user selection of one of the listed video files.

3. The method of claim 1, wherein the receiving a selection of one of the video files comprises:
  performing, by the mobile device, an automatic context based selection of the video file in response to the selected task;
  presenting, on a display of the mobile device, a prompt to play the selected video file; and
  receiving a user selection to play the selected video file in response to the prompt.

4. The method of claim 1, further comprising:
  determining that a predetermined playback condition is met;
  wherein the receiving a selection of one of the tasks comprises performing, by the mobile device, a selection of a task corresponding to the predetermined playback condition;
  wherein the receiving a selection of one of the video files comprises performing, by the mobile device, an automatic context based selection of one of the video files associated with the task;
  wherein the playing is performed automatically by the mobile device without requiring interaction by the user; and
  wherein the video files are language agnostic with no audible speech.

5. The method of claim 1, wherein the selected video file comprises at least one of a first recording demonstrating a proper performance of the selected task or a second recording demonstrating an improper performance of the selected task, wherein the first and second recordings comprise different first and second associated language agnostic visual formatting associated with the proper and improper performances.

6. The method of claim 1, wherein the sensor comprises an explosives detector, a visible light imager, a thermal imager, a radiation detector, and/or a vaporized particle detector.

7. The method of claim 1, wherein the storing comprises storing first firmware in the local memory, wherein the video files are a first set video files embedded in the first firmware, the method further comprising:
  downloading a second set of video files embedded in second firmware; and
  storing the second firmware with the embedded second set of video files in the local memory.

8. The method of claim 7, wherein the mobile device is an explosives detector, wherein the sensor is configured to detect explosive material in response to the external stimulus, wherein the selected task comprises an operation using the explosives detector.

9. The method of claim 7, wherein:
  the first firmware is a first firmware file consisting of the first set of video files; and
  the second firmware is a second firmware file consisting of the second set of video files.

10. A system comprising:
  a handheld mobile device comprising:
    a sensor configured to detect a substance of interest in response to external stimulus, the sensor comprising an explosives detector, a visible light imager, a thermal imager, a radiation detector, and/or a vaporized particle detector;
    a display;
    one or more user controls;
    a processor; and
    a local memory configured to store a plurality of video files comprising recordings of human interactions with the mobile device demonstrating performance of a plurality of tasks using the mobile device, and further configured to store a plurality of machine readable instructions which when executed by the processor are configured to cause the mobile device to:
download the video files from an external device,
store the video files in the local memory,
receive a selection of one of the tasks,
receive a selection of one of the video files demonstrating the selected task,
access the selected video file from the local memory in a location agnostic manner while the mobile device is operated in a handheld portable manner by a user in field without requiring any network connections and without requiring the mobile device to communicate with any external device, and
present the selected video file on the display while the mobile device continues to be operated in the handheld portable manner by the user in field without requiring any network connections.

11. The system of claim 10, wherein the machine readable instructions are configured to cause the mobile device to:
present a menu on the display;
receive a selection of the menu in response to a first user actuation of at least one of the user controls;
present on the display a list of the video files in response to the user selection of the menu; and
receive the selection of one of the video files in response to a second user actuation of at least one of the user controls performed while the list is presented on the display.

12. The system of claim 10, wherein the machine readable instructions are configured to cause the mobile device to:
perform an automatic context based selection of one of the video files in response to the selected task;
present on the display a prompt to play the selected video file; and
play the selected video file in response to a user actuation of at least one of the user controls while the prompt is presented on the display.

13. The system of claim 10, wherein the machine readable instructions are configured to cause the mobile device to:
determine that a predetermined playback condition is met;
select a task corresponding to the predetermined playback condition;
perform an automatic context based selection of one of the video files associated with the task;
play the selected video file automatically without requiring interaction by the user; and
wherein the video files are language agnostic with no audible speech.

14. The system of claim 10, wherein:
the selected video file comprises a first recording demonstrating a proper performance of the selected task and a second recording demonstrating an improper performance of the selected task; and
the first and second recordings comprise different first and second associated language agnostic visual formatting associated with the proper and improper performances.

15. The system of claim 10, further comprising the external device.

16. The system of claim 10, wherein the video files are a first set of video files embedded in first firmware stored in the local memory, wherein the machine readable instructions are configured to cause the mobile device to:
download a second set of video files embedded in second firmware; and
store the second firmware with the embedded second set of video files in the local memory.

17. The system of claim 16, wherein:
the first firmware is a first firmware file consisting of the first set of video files; and
the second firmware is a second firmware file consisting of the second set of video files.

18. A system comprising:
a processor; and
a local memory configured to store a plurality of video files comprising recordings of human interactions with the mobile device demonstrating performance of a plurality of tasks using the mobile device, and further configured to store a plurality of machine readable instructions which when executed by the processor are configured to cause the mobile device to perform the method of claim 1.

* * * * *